United States Patent [19]

Nevoux et al.

[11] Patent Number: 5,412,726
[45] Date of Patent: May 2, 1995

[54] TELECOMMUNICATION INSTALLATION WITH SECURE REMOTE LOADING OF PREPAYMENT MEANS AND CORRESPONDING REMOTE LOADING PROCESS

[75] Inventors: Rola Nevoux, Elancourt; Philippe Hiolle, Herouville Saint Clair, both of France

[73] Assignee: Telecom Etablissement autonome de droit public and la Poste-Etablissement autonome de droit public, Paris, France

[21] Appl. No.: 124,196

[22] Filed: Sep. 21, 1993

[30] Foreign Application Priority Data

Sep. 21, 1992 [FR] France .................. 92 11223

[51] Int. Cl.⁶ .............................. H04K 1/00
[52] U.S. Cl. ........................ 380/24; 380/23; 380/49; 379/91; 455/54.1
[58] Field of Search ............ 380/21, 23, 24, 43, 380/49; 455/54.1, 56.1; 340/825.34; 379/91, 12, 58

[56] References Cited

U.S. PATENT DOCUMENTS

| | | | |
|---|---|---|---|
| 4,630,201 | 12/1986 | White | 379/91 X |
| 4,860,341 | 8/1989 | D'Avello et al. | 379/91 |
| 5,144,649 | 9/1992 | Zicker et al. | 379/91 X |
| 5,264,689 | 11/1993 | Maes et al. | 380/23 X |
| 5,282,250 | 1/1994 | Dent et al. | 380/23 |
| 5,301,234 | 4/1994 | Mazziotto et al. | 380/23 |

FOREIGN PATENT DOCUMENTS 0459065 12/1991 European Pat. Off.
0463384 1/1992 European Pat. Off.
0480833 4/1992 European Pat. Off.

OTHER PUBLICATIONS

Ghillebert, B. et al., "Le systéme cellulaire numérique européen de communication avec les mobiles", *L'Echo des Recherches*, No. 131, pp. 5–16, First Quarter (1988).
Jolie, P. et al., "Une application de la carte á microprocesseur: le module d'identité d'abonné du radiotélé phone numérique européen", *L'Echo des Recherches*, No. 139, pp. 13–19, First Quarter (1990).
Ferreira, R. C., "The Smart Card: A High Security Tool in EDP", *Phillips Telecommunication Review*, vol. 47, No. 3, Hilversum NL, pp. 1–19 (Sep. 1989).

*Primary Examiner*—Tod R. Swann
*Attorney, Agent, or Firm*—Foley & Lardner

[57] ABSTRACT

The installation comprises a remote loading mode in which in response to a remote loading request word (R) for a predetermined number of value units emanating from the autonomous set (PA), there is provided:

- an active authentication of the autonomous set (PA) and of the access system (SAA);
- a calculation of a remote loading passkey (KCH or (SCH, PCH)) at the level of the authorization center (CA);
- a transmission of the enciphered remote loading passkey destined for the access system (SAA);
- a secure remote loading of the prepayment means (MPAY) originating from the access system with the aid of the remote loading passkey thus transmitted.

15 Claims, 4 Drawing Sheets

TELECOMMUNICATION INSTALLATION WITH SECURE REMOTE LOADING OF PREPAYMENT MEANS AND CORRESPONDING REMOTE LOADING PROCESS

The invention relates to the secure remote loading of prepayment means.

BACKGROUND OF THE INVENTION

It finds a general application in telecommunications and more particularly in digital systems for communication with public mobiles operating in the 900 MHz and, also called "GLOBAL SYSTEM FOR MOBILE COMMUNICATION (GSM)". It also finds application in wire-based communication networks.

In a known manner, a telecommunication installation comprises:
at least one switched telephone network;
an autonomous telephone subscriber access system comprising:
  at least one base station linked to the switched telephone network;
  handling means linked to the base station comprising charge metering means able to calculate the charges for using the paying services of the switched telephone network;
  first enciphering/deciphering means able to establish a cryptographic function with the aid of a storage passkey;
at least one autonomous set comprising:
  means able to establish an intercommunication with the base station;
  prepayment means able to contain value units intended for paying the usage charges calculated and transmitted by the charge metering means;
  first means of set authentication able to establish a set authentication function with the aid of a predetermined set base passkey personal to each subscriber;
an authorization center comprising:
  second enciphering/deciphering means able to establish the enciphering/deciphering function with the aid of the storage passkey;
  second means of set authentication able to establish the set authentication function with the aid of the set base passkey.

For example, in the radio telephone application, the autonomous set accesses a paying service of the switched telephone network on completion of an operation to authenticate the identity of the subscriber to the autonomous set employing the first and second means of set authentication.

Preferably, the authentication of the identity of the subscriber to the autonomous set is an active authentication with the exchange between the autonomous set and the authorization center of a random number and of the transform of this random number under the set authentication function with the aid of the set base passkey personal to each subscriber.

Such authentication makes it possible only to ensure the authenticity of the subscriber and the authorization for this subscriber to access the paying services of the switched telephone network.

It does not make it possible to guarantee in respect of the installation, which converses with the subscriber thus identified and authorized to access, that the prepayment means which serve in paying the usage charges are integral throughout the duration of the communication.

The Patent Application No. 90 12510 filed on 10 Oct. 1990 in the name of the Applicant affords a solution to this problem by employing an active authentication of the usage charges throughout the duration of the communication with the aid of the first and second means of set authentication.

This active authentication of the usage charges makes it possible in particular:
  to certify the usage charges transmitted by the charge metering means to the prepayment means via the radio telephone interface;
  to verify that they have been correctly received and understood; and
  to verify that they have actually been deducted from the prepayment means.

Moreover, procedures are known for reloading a predetermined number of value units to the account of the prepayment means.

These procedures generally take place outside the communications proper, either locally, for example at the authorization center directly, or else at the autonomous set "off line", with no link with the authorization center, either remotely, for example through a specialized application such as remote loading by MINITEL (trade mark) server, but this latter procedure does not guarantee proper reception of the remotely loaded amounts, nor the non-repudiation of said remote loading by the autonomous set.

Furthermore, the remote loading of the prepayment means may be necessitated when the subscriber is checked by a third-party authorization center, different from that which issued or manages the prepayment means and to which the autonomous set is not commercially attached (this is the case for example when a subscriber uses his autonomous set in a zone covered by an operator other than the one responsible for its management, that is to say in the case of the so-called ROAMING service in the GSM application).

In this situation, the solution which consists in remotely loading the prepayment means on the initiative of the third-party authorization center is unsatisfactory at the security level.

Indeed, the confidentiality and integrity of the remote loading order and of its amount are not guaranteed, which may allow fraudulent reproductions.

The present invention affords a solution to this problem.

SUMMARY OF THE INVENTION

Thus, its aim is to provide a telecommunication installation capable of ensuring the confidentiality and integrity of the remote loading order and its amount, even when the subscriber frequents an access system to which the autonomous set is not attached commercially (so-called ROAMING service in the GSM application).

It also aims to guarantee in respect of the access system thus frequented that the remote loading order as well as its amount have been correctly received and understood and that the prepayment means units meter has actually been reloaded with the number of value units thus remotely loaded.

Lastly, it aims at a process of secure remote loading of prepayment means guaranteeing the non-repudiation of the remote loading order by the subscriber.

The present invention starts from a telecommunication installation of the type mentioned above.

According to a first characteristic of the invention, the autonomous set furthermore comprises:

first generator means able to establish a generation function with the aid of the set base passkey;

first remote loading means able to establish a remote loading function with the aid of a remote loading passkey which is the transform of a predetermined word under the generation function with the aid of the set base passkey;

the access system furthermore comprises:

second remote loading means able to issue a predetermined number of value units in response to a predetermined remote loading order and to establish the remote loading function with the aid of the remote loading passkey;

first means of system authentication able to establish a system authentication function with the aid of a predetermined system base passkey;

the authorization center furthermore comprises:

second means of system authentication able to establish the system authentication function with the aid of the system base passkey; and second generator means able to establish the generation function with the aid of the set base passkey; and the installation furthermore comprises a remote loading mode in which in response to a remote loading request word for a predetermined number of value units emanating from the autonomous set, the first and second means of set authentication as well as the first and second means of system authentication carry out a respective active authentication of the autonomous set as well as of the access system, by respectively exchanging a set authentication word emanating from the autonomous set and the transform of this word under the set authentication function with the aid of the set base passkey as well as by exchanging a system authentication word emanating from the authorization center and the transform of this system authentication word under the system authentication function with the aid of the system base passkey;

in the case of checked authenticity of the access system and of the autonomous set, the second generator means calculate at the level of the authorization center the remote loading passkey, which is the transform of the remote loading request word under the generation function with the aid of the set base passkey;

the case of generation of the remote loading passkey at the level of the authorization center, the second enciphering/deciphering means transmit the enciphered loading passkey with the aid of the storage passkey to the first enciphering/deciphering means which decipher it with a view to storing it at the level of the access system; and in the case of storage of the remote loading passkey in the access system, the first and second remote loading means exchange the remote loading request word for the number of value units to be remotely loaded as well as the transform of said remote loading request word under the remote loading function with the aid of the remote loading passkey with a view to remotely loading, in a secure manner, the means for prepayment of the said number of value units.

Such an installation has the advantage of enabling the subscriber, to whom the prepayment means have been delivered by a first handler and who moves around checked by a second handler, to remotely load his prepayment means at any time. Moreover, the remote loading procedure takes place dynamically, securely and without breaking off communication if appropriate.

Advantageously, the request for remote loading of the predetermined number of value units takes place outside the telephone communication, on request by the subscriber.

As a variant, the request for remote loading of the predetermined number of value units is carried out during the telephone communication.

The invention also relates to a process for secure remote loading of prepayment means hinging on a mode of remote loading of the type mentioned above.

BRIEF DESCRIPTION OF THE DRAWINGS

Other characteristics and advantages of the invention will come to light from the detailed description below and from the attached drawings in which:

In FIG. 1, a radio telephone installation of known type places a mobile and autonomous telephone subscriber access system SAA in cooperation with a plurality of mobile or fixed autonomous sets PA.

The access system SAA comprises a plurality of base stations BF, each linked to the switched telephone network RTC.

Figure 1:
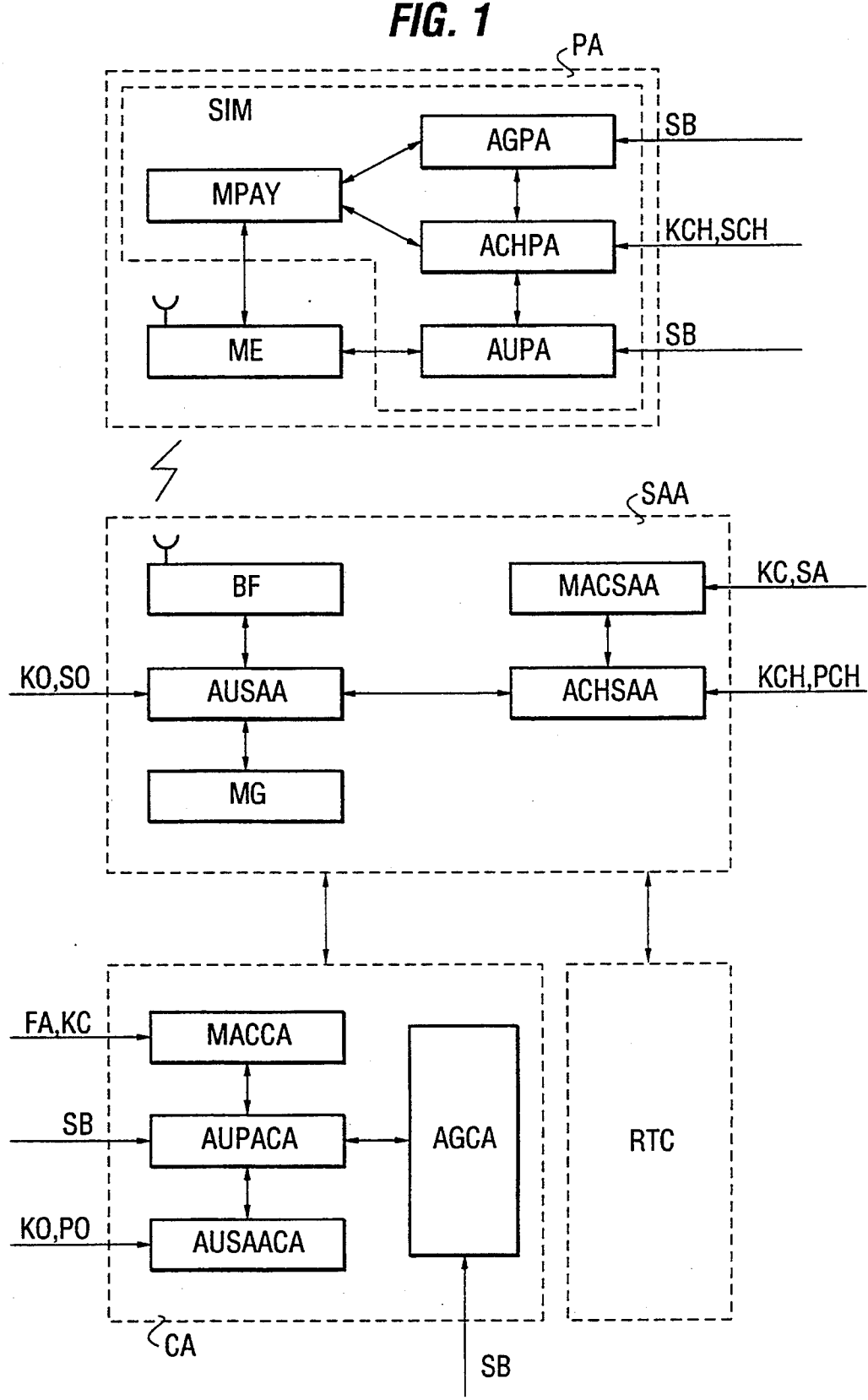
FIG. 1 is a synopsis illustrating a radio telephone installation according to the invention.

In order to facilitate the understanding of the invention, only one autonomous set PA and one base station BF are represented in FIG. 1.

Each autonomous set comprises means ME for establishing a radio telephone intercommunication with the closest base station BF.

An authorization center CA connected to the system SAA supervises and checks, as will be seen in more detail later, the communications between the access system and the autonomous sets.

An installation of this kind, which finds for example an application in the GSM, is described in the journal "L'ECHO DES RECHERCHES" No. 131, first quarter 1988, pages 5 to 16, B. GHILLEBERT, P. COMBESCURE, A. MALOBERTI, as well as in No. 139, first quarter 1990, pages 13 to 19, P. JOLIE, G. MAZZIOTTO in the same journal.

In practice, at the access system level, there are provided handling means linked to the base station BF which comprise charge metering means MG able to calculate the charges for using the paying services of the switched telephone network RTC.

For its part, the autonomous set PA comprises prepayment means MPAY, which can be reloaded remotely and possess a processing unit (not shown) and a memory (not shown) which can contain value units intended for paying the usage charges calculated and transmitted by the charge metering means.

In practice, the memory is protected against untimely direct writing of data via the outside world.

Advantageously, in the GSM application, the prepayment means MPAY are housed in a removable subscriber identity module SIM which cooperates with the means ME for establishing radio telephone intercommunication of the autonomous set PA.

Preferably, the memory of the prepayment means MPAY is of the EPROM or EEPROM type, correctly protected by the logic of the processing unit of the SIM module.

The SIM module is housed in a standard ISO type card.

As a variant, the SIM module is a component which plugs into the means for establishing the radiotelephone intercommunications ME.

As described in the French Patent Application No. 90 12510, there are provided, at the level of the autonomous set, first means of set authentication AUPA able to establish a set authentication function A with the aid of a predetermined set base passkey SB and at the level of the authorization center CA, there are provided second means of set authentication AUPACA able to establish the set authentication function A with the aid of said set base passkey SB.

It should be noted that in the abovementioned patent application, the first and second means of set authentication AUPA and AUPACA serve to authenticate the usage charges during the intercommunication.

In the GSM application, the base set passkey SB is for example a secret passkey, personal to each subscriber and for example 128 bits in length.

As regards the set authentication function A, it is for example a cryptographic function of the DES (DATA ENCRYPTION STANDARD) type.

In a known manner, the access system SAA is also provided with first enciphering/deciphering means MACSAA which establish a cryptographic function AC or FC with the aid of a storage passkey KC or FA.

Symmetrically, the authorization center CA is provided with second enciphering/deciphering means MACCA which establish the cryptographic function AC or FC with the aid of the storage passkey KC or FA.

As mentioned above, the aim of the invention is to provide a secure procedure for remote loading of the prepayment means.

In order to achieve this aim, the installation according to the invention is completed, at the level of the autonomous set PA, with first generator means AGPA able to establish a generation function AG with the aid of the set base passkey SB and with first remote loading means ACHPA able to establish a remote loading function ACH or FCH, with the aid of a remote loading passkey KCH or PCH which is the transform of the generation function AG with the aid of the set base passkey SB.

By symmetry, at the level of the access system SAA, the installation is completed by second remote loading means ACHSAA able to issue a predetermined number of value units n and to establish the remote loading function ACH with the aid of the remote loading passkey KCH or PCH and with first system authentication means AUSAA able to establish a system authentication function AO or FO with the aid of a predetermined system base passkey KO or SO.

Also by symmetry, the authorization center CA furthermore comprises according to the invention second generator means AGCA able to establish the generation function AG with the aid of the set base passkey SB and of second system authentication means AUSAACA able to establish the system authentication function AO or FO with the aid of the system base passkey KO or PO.

In practice, the system authentication AO or FO, set authentication A, cryptographic AC or FC, remote loading ACH or FCH and generation AG functions hinge around cryptographic algorithms which may be "DES" (DATA ENCRYPTION STANDARD) OR "RSA" (RIVEST SHAMIR ADLEMAN).

These DES or RSA algorithms are stored in readonly memories.

It should be recalled here that the DES cryptographic algorithm operates from a secret base passkey. Also, for the elements of the installation to be able to converse with the aid of DES, it is necessary for the secret passkey to be stored in both conversing elements at once.

By contrast, the RSA algorithm operates with the aid of a base passkey which is in fact the combination of two passkeys which depend on one another, one being a public passkey stored in one of the two conversing elements and the other being a secret passkey stored in the other of the two elements.

For example, in the case where the system authentication function AO hinges around a DES algorithm, a secret system base passkey KO is stored both at the system SAA level in the means AUSAA and at the authorization center CA level in the means AUSAACA.

Thus, the transform RESS of a random number S under the system authentication function AO with the aid of the secret system base passkey KO can be written as follows:

$$RESS = AO(KO, S)$$

By contrast, in the case where the system authentication function FO hinges around a RSA algorithm, a secret system base passkey SO is stored only at the access system AUSAA level while a public system base passkey PO is stored at the authorization center CA level. Thus, the transform RESS of a random number S under the system authentication function FO with the aid of the secret passkey SO can be written as follows:

$$RESS = SO(S)$$

whilst at the authorization center level, the system authentication means AUSAACA calculate the transform of the word RESS under the system authentication function FO with the aid of the public system base passkey PO;

Verification of the authenticity of the access system SAA can then be written as follows:

$$PO(RESS) = ?(S)$$

The above formulae will serve in the detailed description below of the remote loading procedure according to the invention.

The RSA or DES cryptographic algorithms are commercially marketed algorithms.

The secure remote loading procedure according to the invention breaks down into two parts.

The first part consists of a step of negotiation between the frequented access system and the authorization center responsible for managing the prepayment means.

In short, it involves authentication of the autonomous set as well as of the access system in relation to the authorization center. Once the authenticity of the autonomous set and of the access system has been checked, the authorization center provides the access system with a temporary remote loading passkey which will enable the access system to authenticate itself in relation to the prepayment means.

The second part arises next between the access system and the prepayment means in order to remotely and securely load a predetermined number of value units.

Figure 2:
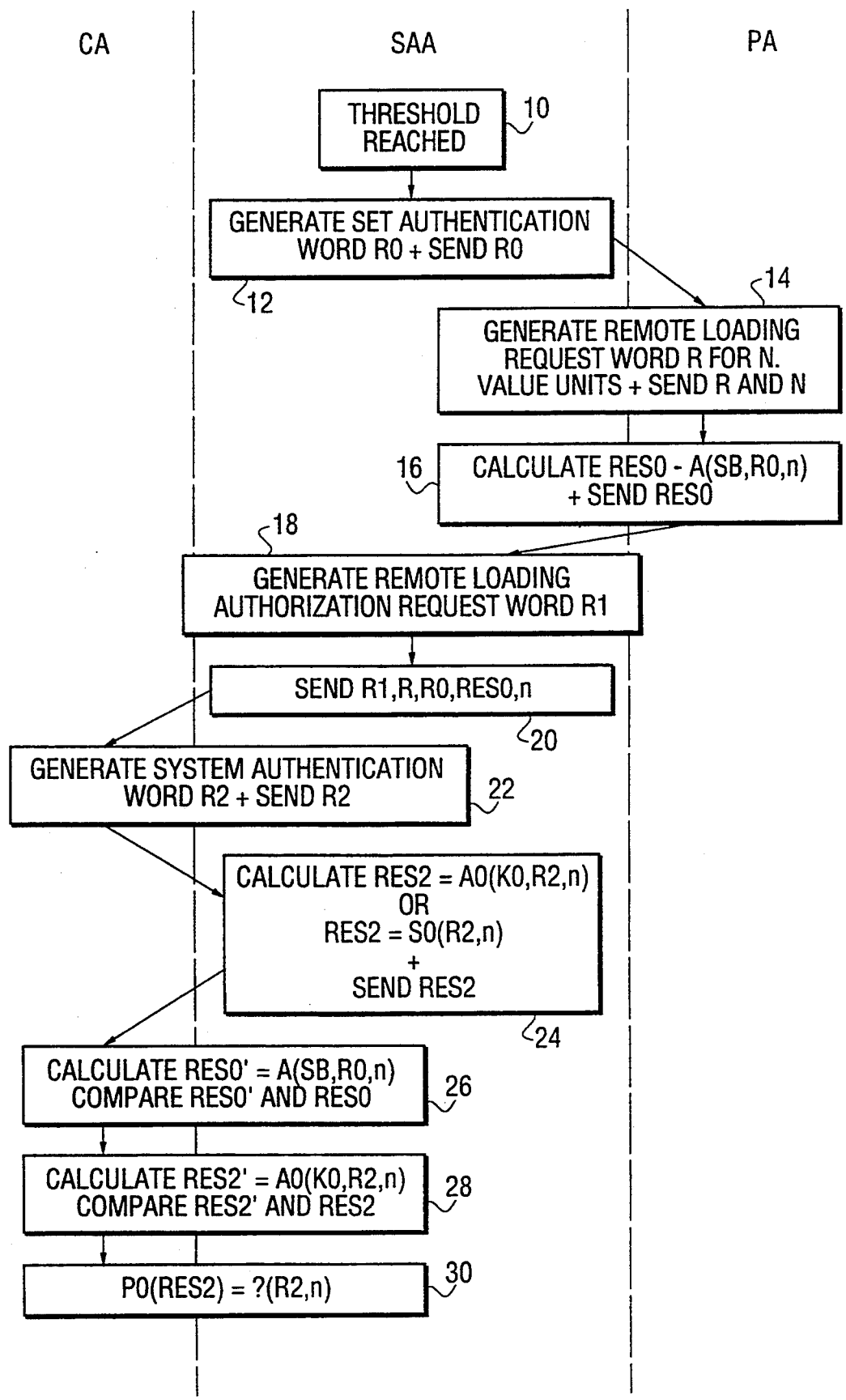
FIGS. 2 and 3 are flowcharts illustrating the first part of the secure remote loading procedure according to the invention.
Figure 3:
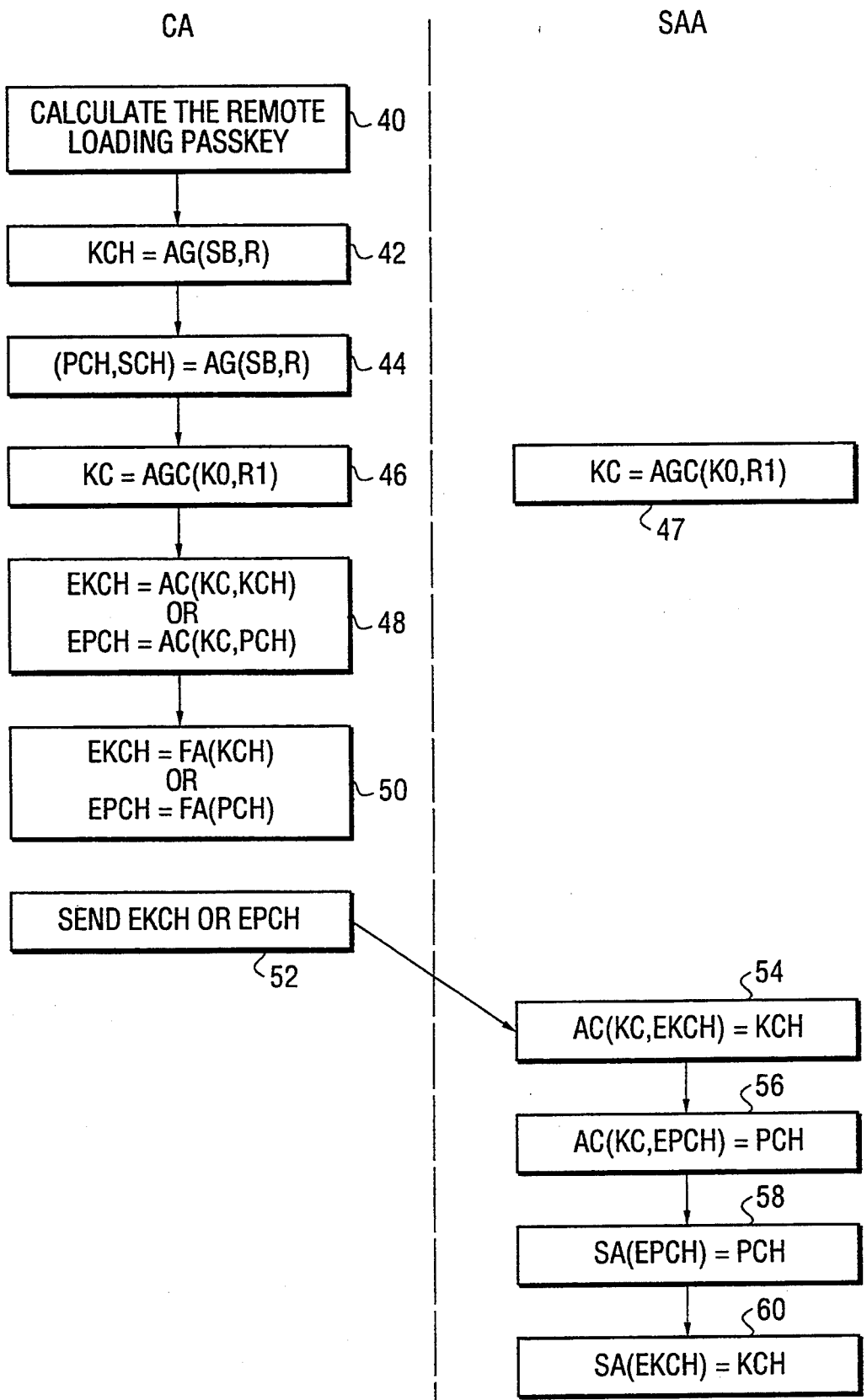

With reference to FIGS. 2 and 3, the first part of the remote loading procedure according to the invention is now described in detail.

In practice, for the prepayment means MPAY, the access system SAA frequented utilizes, during the intercommunication, the available credit (number of units and monetary unit used).

For example, when this value reaches or exceeds a certain threshold (step 10) the access system generates a set authentication word R0 (step 12) and sends this set authentication word R0 to the autonomous set.

In response to this set authentication word R0, the autonomous set is faced with several solutions.

In the first place, the prepayment means belong to the access system. In this case, the access system possesses the information required to remotely load said prepayment means.

In the second place, the prepayment means belong to an authorization center for which the access system is accredited. This access system therefore possesses the information required for the remote loading of the prepayment means.

In the third place, the prepayment means belong to an authorization center for which the access system frequented is not accredited. The access system thus frequented must therefore address itself to the authority issuing the prepayment means in order to have the information required for the remote loading.

It is in this third situation that the remote loading procedure according to the invention is involved, requiring the setting in place:
of a mechanism of reciprocal authentication between the access system and the authorization center;
of a mechanism for confidentiality of the secret information exchanged; and
of a mechanism for non-repudiation.

Thus, in the case where the prepayment means belong to an authority for which the access system frequented is not accredited, the autonomous set being advised of an exceeding of threshold at the level of the credit of the prepayment means, the prepayment means make a request for remote loading of n value units which consists in generating a random number also called a remote loading request word R (step 14) and sends this random word R back to the access system SAA.

Next, during step 16, the first means of set authentication calculate the transform RES0 of the set authentication word R0 under the set authentication function A with the aid of the set base passkey SB. The number of value units requested n also participates in the calculation of this transform RES0.

On completion of step 16, the remote loading request word R, the transform RES0 and the number of value units n are sent to the access system SAA.

In response to the words R, RES0 and n, the access system makes a credit authorization request (step 18). This credit authorization request consists in generating a credit authorization request word R1 and in sending the words R1, R, R0, RES0 and n (step 20) to the authorization center CA.

In response to these words, the authorization center makes a system authentication request (step 22) which consists in the generation of a system authentication word R2 and the sending of this system authentication word R2 to the access system SAA.

The mutual authentication between the access system and the authorization center is played out by the first and second system authentication means AUSAA and AUSAACA (steps 22, 24, 26).

In step 24, the system authentication function can hinge around a DES type cryptographic algorithm. It then calculates the transform RES2 of the word R2 by the system authentication function AO with the aid of the secret system base passkey KO.

By contrast, in the case where the system authentication means hinge around a RSA type cryptographic algorithm, the system authentication means then calculate the transform RES2 of the system authentication word R2 with the aid of the secret passkey SO stored at the system SAA level.

It should be noted that in step 24, the number of value units n also participates in the calculation of the transform RES2.

Finally, on completion of step 24, the access system SAA sends the transform RES2 to the authorization center.

At the authorization center CA level, checking is undertaken of the authentication of the set PA as well as of the authentication of the system SAA.

As regards the checking of the authentication of the set, there are undertaken the calculation of the transform RES0' under the set authentication function A with the aid of the set base passkey SB (step 26) and the comparison of the transform RES0' thus calculated and of the transform RES0 thus received.

As regards the checking of the systemauthentication, there are undertaken the calculation of the transform RES2' under the system authentication function AO with the aid of the passkey KO (step 28) and the comparison of the transform RES2' thus calculated and of the transform RES2 thus received. Step 28 comes in in the case where the system authentication means are based on a DES type algorithm, By contrast, in the case where the system authentication means hinge around a RSA algorithm, it is then calculated during step 30 on deciphering the transform RES2 under the public passkey PO stored at the authorization center level in order to verify the authentication of the system word R2.

In the case of verified authenticity of the autonomous set and of the system, there is undertaken the calculation of the remote loading passkey (step 40). In the case where the remote loading passkey is a secret passkey of a DES type algorithm, the remote loading passkey KCH is the transform of the credit request word R under the function AG for generation with the aid of the passkey SB (step 42).

By contrast, in the case of a RSA type algorithm, the function AG for generation with the aid of the passkey SB makes it possible to obtain a pair of passkeys consisting of a public passkey PCH and a secret passkey SCH designated by (PCH, SCH) (step 44). The public passkey PCH is stored at the access system SAA level.

Once the remote loading passkey KCH or PCH has been generated at the authorization center level, it is then appropriate to transmit this remote loading passkey KCH, or the public part PCH of this remote loading passkey if appropriate, enciphered to the access system.

The enciphering of the remote loading passkey KCH or PCH can be carried out either with the aid of a DES type cryptographic algorithm, or with the aid of a RSA type cryptographic algorithm.

In the case of a DES type cryptographic algorithm, it is appropriate to utilize a storage passkey KC at the level of the authorization center CA and of the access system SAA.

For example, the storage passkey KC is the transform of the word R1 under the cryptographic function AGC with the aid of the system base passkey KO (steps 46 and 47).

The enciphering EKCH of the remote loading passkey KCH (step 48) is then carried out by the cryptographic function AC with the aid of the secret storage passkey KC thus available at the level of the access system SAA and of the authorization center CA.

As a variant, the enciphering EPCH of the remote loading passkey PCH is then carried out by the cryptographic function AC with the aid of the secret storage passkey KC.

By contrast, in the case of a RSA type enciphering-/deciphering algorithm, it is appropriate to utilize at the level of the authorization center CA a public passkey FA, a level of the access system SAA of a secret passkey SA.

The enciphering EKCH of the remote loading passkey KCH (step 50) is then carried out with the aid of the public passkey FA.

As a variant, the enciphering EPCH of the remote loading passkey PCH is then carried out with the aid of the public passkey FA.

Once enciphered, the passkey EKCH or EPCH (step 52) is sent to the access system SAA which will, for its part, decipher said passkey thus received enciphered. As a corollary of the enciphering/deciphering means set in place, the deciphering of the passkey KCH or of the passkey PCH is undertaken as appropriate, according to the formulae described in steps 54, 56, 58 and 60.

Figure 4:
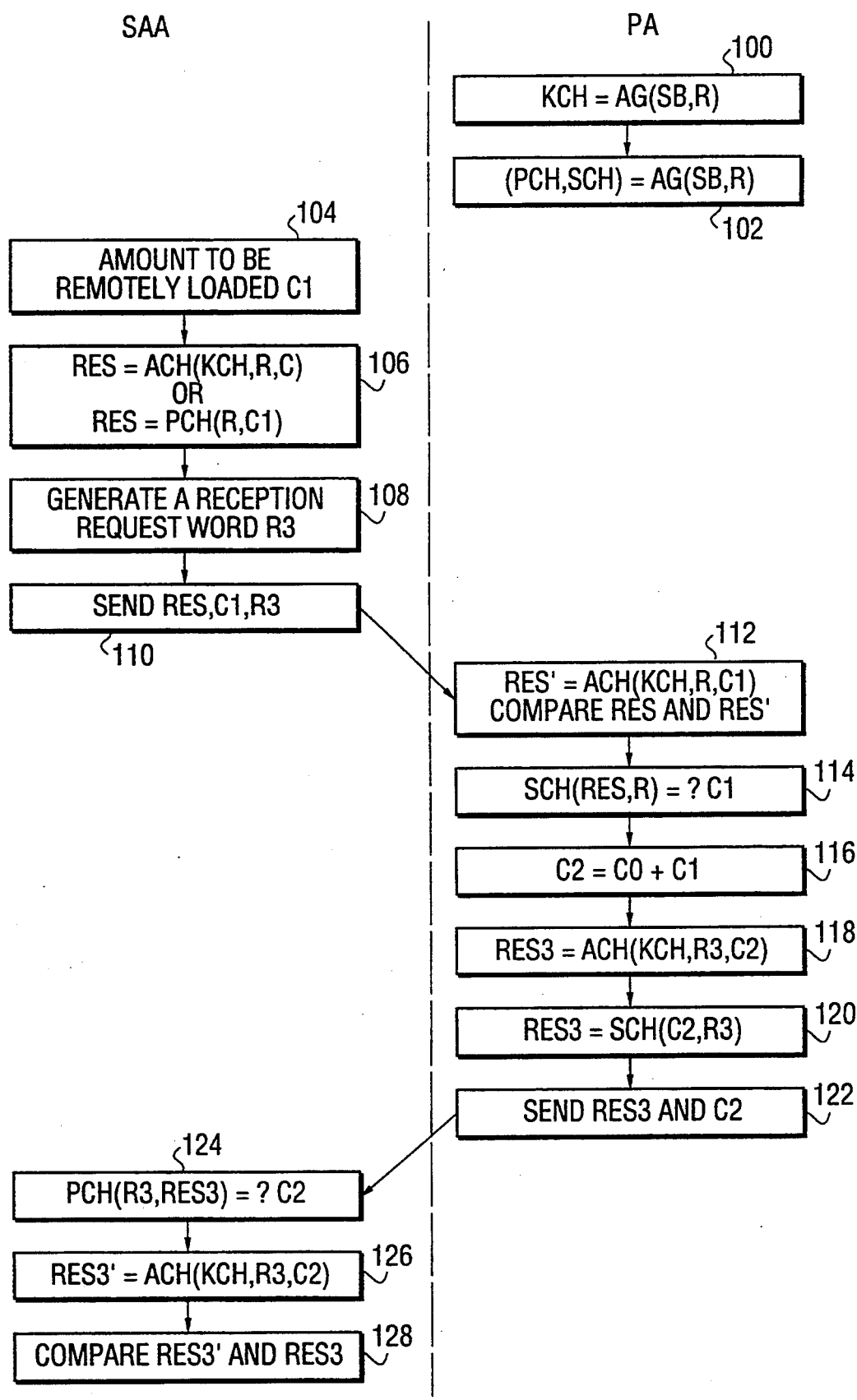
FIG. 4 is a flowchart illustrating the second part of the remote loading procedure and its authentication according to the invention.

Reference is now made to FIG. 4 for the second part of the procedure for remote loading of the prepayment means.

The remote loading takes place between the charge metering means of the access system SAA responsible for the remote loading of the prepayment means and the autonomous set PA.

As was seen in more detail earlier, the access system SAA utilizes the remote loading function ACH as well as the temporary remote loading passkey KCH or PCH.

On completion of the steps for authentication of the autonomous set as well as of the access system and of the generation of the passkey KCH or (PCH, SCH) and of its sending enciphered to the access system and of said enciphering of this passkey, there is lastly undertaken the procedure for remote loading of the prepayment means.

It should be noted that the autonomous set also intrinsically utilizes the remote loading passkey KCH or (PCH, SCH) (steps 100, 102).

The access system SAA establishes the amount to be remotely loaded C1 (step 104) as a function of the number of value units n requested.

The access system calculates the transform RES of the remote loading request R, dependent on the amount C1, with the remote loading function ACH or SCH with the aid of the passkey KCH or the public passkey PCH (step 106).

It should be noted that the remote loading function ACH hinges around a RSA type algorithm (PCH, SCH) or around a DES type algorithm (secret passkey KCH).

After calculating the transform RES under the function ACH, the access system SAA generates a reception request random word R3 (step 108) and sends the transform RES, the amount C1 and said random word R3 (step 110) to the autonomous set PA.

For its part, the autonomous set will verify the signature of the system SAA by calculating the transform RES' in the case of a DES type algorithm (step 112), or else the transform of RES and of the word R under the secret remote loading passkey SCH in the case of a RSA type algorithm (step 114).

In the case of the authenticity of the system SAA, calculation is undertaken of the new credit C2 (step 116).

The prepayment means then sign the new credit C2 with the passkey KCH and the random word R3 (step 118) or else with the passkey SCH and said random word R3 according to the chosen cryptographic algorithm (step 120).

Finally, during step 122, the new credit C2 and the transform RES3 are sent.

For its part, the access system verifies the authenticity of the reception of the remote loading by calculating RES3' in the case of a DES type algorithm (steps 126 and 128) and by verifying the authenticity of the transform RES3 through the use of the RSA type algorithm (step 124).

Advantageously, before exchanging the remote loading request word R and its transform RES, the system authentication means AUSAA and AUSAACA exchange the authorization authentication word (step 118, FIG. 2) and its transform RES1 under the system authentication function KO, SO, with a view to authenticating the authorization of the remote loading order.

The non-repudiation between the access system and the authorization center is guaranteed by the principle of usage of the temporary remote loading passkey KCH or (PCH, SCH). Thus, the managing authority cannot decline to have to authorize a remote loading, since it is the only one capable of providing said remote loading passkey which served for the remote loading operation.

On the other hand, the access system cannot claim to have received remote loading authorizations given that the latter are effective only when they are associated with said remote loading passkey.

Advantageously, in the GSM application, the remote loading means ACHPA and the generation means AGPA are housed in the removable subscriber identity module SIM.

Implementation of the invention in the case of a GSM application which uses a subscriber identity module SIM requires the presence, in this module, of a prepaid application.

This prepaid application requires an unoccupied reading file and a protected updating by the presenting of the remote loading passkey KCH or (PCH, SCH).

It should be noted that this remote loading passkey KCH or (PCH, SCH) is temporary and enables a frequented authority to write a value into the prepaid file, representing the value of the credit to be added into the memory of the SIM module.

In a GSM application with the use of a SIM module, the means ME for establishing radio telephone intercommunication transmit to the subscriber identity module SIM undergoing communication a proposal for remote loading RO as described earlier and subsequently the word C1 containing the amount to be remotely loaded certified with the temporary remote loading passkey KCH or (PCH, SCH).

In the case of a GSM application, the first means of remote loading and of generation are in the SIM module.

The access system SAA is located at the level of the VLR ("VISITOR LOCATION REGISTER") and the authority CA is located at the level of the HLR ("HOME LOCATION REGISTER") if the module is issued by a radio communications operator.

At the level of the switched telephone network, the SIM module carrying the prepaid application is identified by a subscriber identity number IM which refers to a nominal location register.

During communication, the SIM module is then located at the level of the VLR register.

According to the invention, it is therefore the VLR register which takes on the debiting of the charges for using the SIM module.

It should be noted that the VLR register knows the credit of the prepayment means remaining at any moment.

Thus, when this credit reaches a given threshold, the register VLR informs the module SIM while proposing remote loading thereto.

In response to this information, the SIM generates the random number R which makes it possible to authenticate the SIM module in an active manner and requesting it to generate a temporary reloading passkey KCH or (PCH, SCH), as described with reference to FIGS. 2 and 3.

In parallel, the register VLR is authenticated in relation to the register HLR and requests the temporary remote loading passkey from it.

It is this remote loading passkey which is used next to check the remote loading operation between the VLR and the SIM.

By way of example, the words R, R0, R1, R2, R3 are 128-bit random words. The values to be remotely loaded and the amount available on the prepaid module C1 and C2 stretch over 4 bits.

The passkey word RES0 has 32 bits.

The passkey words RES, RES1, RES2 and RES3 are 128-bit words.

The passkeys KO and KC are 128-bit passkeys, whereas the remote loading passkey KCH, (PCH or SCH) can vary from 64 bits to 512 bits depending on the type of cryptographic algorithm chosen.

It should be noted that the invention is not limited to an intercommunication of the radio type between the autonomous set and the access system.

Indeed, it relates to any communication network. Thus, it may be applied to installations employing:
a mobile or fixed personal autonomous set with a radio link with the access system;
a fixed public autonomous telephone set with a wire or radio link with the access system; or
a mobile or fixed personal autonomous set with a wire link with the access system.

This general application to any communication network is explained by the fact that the mode of remote loading according to the invention is not affected by the differences in link between the autonomous set and the access system.

In practice, in the case of a radio telephone installation (FIGS. 1 to 4), the intercommunication module of the autonomous set ME is a radio module which converses with a base station BF of the access system SAA.

By contrast, for a wire-type telephone installation, the intercommunication module of the autonomous set ME is a wire module which converses with a base station consisting of a telephone network connection unit, (for example a public telephone connection unit URP or a local switch panel).

It should be noted that the remote loading procedure according to the invention matches well with the service knownby the initials UPT "Universal Personal Telecommunication".

More precisely, this service makes it possible to offer the subscribers the possibilities of personal mobility across several communication networks offering this service owing to the fact in particular that each subscriber is known through a unique personal identification number. Thus, during his movements in a wiretype communication network, the subscriber utilizes registering functions making it possible to indicate his location to the usage center at any moment.

The result of this is that the remote loading procedure described with reference to FIGS. 1 to 4 advantageously supplements the UPT service for prepaid applications.

It should be noted also that the remote loading procedure according to the invention applies also to wire networks having no UPT service. For example, in the context of the phone card, agreements may exist between first and second operators such as to permit access by a phone card managed or issued by the first operator to the communication network managed by the second operator, and vice versa.

We claim:
1. A telecommunication installation comprising:
at least one switched telephone network (RTC);
an autonomous telephone subscriber access system (SAA) comprising:
  at least one base station (BF) linked to the switched telephone network;
  handling means linked to the base station comprising charge metering means (MG) able to calculate the charges for using the paying services of the switched telephone network (RTC);
  first enciphering/deciphering means (MACSAA) able to establish a cryptographic function (AC or SA) with the aid of a storage passkey (KC or SA);
at least one autonomous set (PA) comprising:
  means able to establish an intercommunication with the base station (BF);
  prepayment means (MPAY) able to contain value units intended for paying the usage charges calculated and transmitted by the charge metering means;
  first means of set authentication (AUPA) able to establish an authentication function (A) with the aid of a predetermined set base passkey (SB) personal to each subscriber;
an authorization center (CA) comprising:
  second enciphering/deciphering means (MACCA) able to establish the enciphering/deciphering function (AC or FC) with the aid of the storage passkey (KC or FA);

second means of set authentication (AUPACA) able to establish the set authentication function (A) with the aid of the set base passkey (SB);

wherein the autonomous set (PA) furthermore comprises:

first generator means (AGPA) able to establish a generation function (AG) with the aid of the set base passkey (SB);

first remote loading means (ACHPA) able to establish a remote loading function (ACH or SCH) with the aid of a remote loading passkey (KCH or SCH) which is the transform of a predetermined word under the generation function (AG) with the aid of the set base passkey (SB);

wherein the access system (SAA) furthermore comprises:

first means of system authentication (AUSAA) able to establish a system authentication function (AO or FO) with the aid of a predetermined system base passkey (KO or SO);

second remote loading means (ACHSAA) able to issue a predetermined number of value units and to establish the remote loading function (ACH or FCH) with the aid of the remote loading passkey (KCH or PCH);

wherein the authorization center (CA) comprises:

second means of system authentication (AUSAACA) able to establish the system authentication function (AO or FO) with the aid of the system base passkey (KO or PO); and second generator means (AGCA) able to establish the generation function (AG or FG) with the aid of the set base passkey (SB); and wherein the installation furthermore comprises a remote loading mode in which in response to a remote loading request word (R) for a predetermined number of value units emanating from the autonomous set (PA), the first and second means of set authentication (AUPA and AUPACA) as well as the first and second means of system authentication (AUSAA and AUSAACA) carry out a respective active authentication of the autonomous set as well as of the access system, by respectively exchanging a set authentication word (R0) emanating from the access system and the transform (RES0) of this word under the set authentication function (A) with the aid of the set base passkey (SB) as well as by exchanging a system authentication word (R2) emanating from the authorization center (CA) and the transform (RES2) of this word under the system authentication function (AO or FO) with the aid of the system base passkey (KO or SO);

wherein in the case of checked authenticity of the access system and of the autonomous set, the second generator means (AGCA) calculate the remote loading passkey (KCH or (SCH, PCH)) at the level of the authorization center (CA), the remote loading passkey being the transform of the remote loading request word under the generation function (AG) with the aid of the set base passkey (SB);

wherein in the case of generation of the remote loading passkey at the level of the authorization center, the second enciphering/deciphering means (MACCA) transmit the enciphered loading passkey (EKCH or EPCH) with the aid of the storage passkey (KC or FA) to the first enciphering/deciphering means (MACSAA) which decipher it with a view to storing it at the level of the access system (SAA) and in the case of storage of the remote loading passkey in the access system (SAA), the first and second remote loading means (ACHSAA and ACHPA) exchange the remote loading request word (R) for the number of value units to be remotely loaded (n) as well as the transform (RES) of said remote loading request word under the remote loading function (ACH or FCH) with the aid of the remote loading passkey (KCH or (SCH, PCH)) with a view to remotely loading, in a secure manner, the means for prepayment of said number of value units (n).

2. The installation as claimed in claim 1, wherein before exchanging the remote loading request word (R) and its transform (RES), the first and second system authentication means (AUSAA and AUSAACA) exchange an authorization authentication word (R1) and its transform (RES1) under the system authentication function (AO or FO) with the aid of the system authentication passkey (KO or (PO, SO)) with a view to authenticating the authorization of the remote loading order.

3. The installation as claimed in claim 1, wherein simultaneously with the exchanging of the remote loading request word (R) and its transform (RES), the first and second remote loading means (ACHSAA and ACHPA) exchange a reception authentication word (R2) and its transform (RES2) under the remote loading function (ACH or FCH)) with the aid of the remote loading key (KCH or (PCH, SCH)) with a view to authenticating the reception of the remote loading order.

4. The installation as claimed in claim 1 wherein the set authentication (A), system authentication (AO, FO), enciphering/deciphering (AC, FC), generation (AG) or remote loading (ACH or FCH) functions are cryptographic algorithms of the DES or RSA type.

5. The installation as claimed in claim 1 wherein the procedure for remotely loading the prepayment means (MPAY) takes place in real time during the communication.

6. The installation as claimed in claim 1 wherein the procedure for remotely loading the prepayment means (MPAY) takes place before call establishment, on request of the subscriber or on the initiative of the network.

7. The installation as claimed in claim 1, wherein the prepayment means (MPAY), the first remote loading means (ACHPA), the first generation means (AGPA) and the first set authentication means (AUPA) are housed in a removable subscriber identity module (SIM) able to cooperate with the means (ME) for establishing radio intercommunication.

8. The installation as claimed in claim 7 wherein the subscriber identity module SIM comprises a memory protected against untimely direct writing of the data via the outside world and able to contain value units and a processing unit able to pay the usage charges with the aid of said value units and to reload the memory with the aid of the remotely loaded value units.

9. The installation as claimed in claim 7 wherein the subscriber identity module (SIM) is housed in a standard ISO type card and wherein the means for establishing radio intercommunications (ME) comprise a reader for reading said card.

10. The installation as claimed in claim 7 wherein the subscriber identity module comprises a mechanical interface able to plug into the means of establishing radio intercommunications (ME).

11. The installation as claimed in claim 1 wherein the intercommunication between the autonomous set and the base station is by radio or by wire.

12. The installation as claimed in claim 1 wherein the autonomous set is mobile or fixed, personal or public.

13. A process for secure remote loading of prepayment means comprising the following steps:
   a) providing at least one switched telephone network (RTC);
   b) providing an autonomous telephone subscriber access system (SAA) comprising:
      b1) at least one base station (BF) linked to the switched telephone network;
      b2) handling means linked to the base station comprising charge metering means (MG) able to calculate the charges for using the paying services of the switched telephone network (RTC);
   c) providing at least one autonomous set (PA) comprising:
      c1) means able to establish an intercommunication with the base station (BF);
      c2) prepayment means (MPAY) able to contain value units intended for paying the usage charges calculated and transmitted by the charge metering means;
      c3) first means of set authentication (AUPA) able to establish an authentication function (A) with the aid of a predetermined set base passkey (SB) personal to each subscriber;
   d) providing an authorization center (CA) comprising:
      d1) second enciphering/deciphering means (MACCA) able to establish the enciphering/deciphering function (AC or FC) with the aid of the storage passkey (KC or FA);
      d2) second means of set authentication (AUPACA) able to establish the set authentication function (A) with the aid of the set base passkey (SB);
wherein there is furthermore provision for equipping the autonomous set (PA) with:
   first generator means (AGPA) able to establish a generation function (AG) with the aid of the set base passkey (SB);
   first remote loading means (ACHPA) able to establish a remote loading function (ACH or FCH) with the aid of a remote loading passkey (KCH or SCH) which is the transform of a predetermined word under the generation function (AG) with the aid of the set base passkey (SB);
wherein there is furthermore provision for equipping the access system (SAA) with:
   first means of system authentication (AUSAA) able to establish a system authentication function (AO or FO) with the aid of a predetermined system base passkey (KO or SO);
   second remote loading means (ACHSAA) able to issue a predetermined number of value units and to establish the remote loading function (ACH or SCH) with the aid of the remote loading passkey (KCH or PCH);
wherein there is furthermore provision for equipping the authorization center (CA) with:
   second means of system authentication (AUSAACA) able to establish the system authentication function (AO or FO) with the aid of the system base passkey (KO or PO); and
   second generator means (AGCA) able to establish the generation function (AG) with the aid of the set base passkey (SB); and
wherein the process furthermore comprises a remote loading step in which in response to a remote loading request word (R) for a predetermined number of value units emanating from the autonomous set (PA), the first and second means of set authentication (AUPA and AUPACA) as well as the first and second means of system authentication (AUSAA and AUSAACA) carry out a respective active authentication of the autonomous set as well as of the access system, by respectively exchanging a set authentication word (R0) emanating from the access system and the transform (RES0) of this word under the set authentication function (A) with the aid of the set base passkey (SB) as well as by exchanging a system authentication word (R2) emanating from the authorization center (CA) and the transform (RES2) of this word under the system authentication function (AO or FO) with the aid of the system base passkey (KO or SO);
   wherein in the case of checked authenticity of the access system and of the autonomous set, the second generator means (AGCA) calculate the remote loading passkey (KCH, or (SCH, PCH)) at the level of the authorization center (CA), the remote loading passkey being the transform of the remote loading request word under the generation function (AG) with the aid of the set base passkey (SB);
   wherein in the case of generation of the remote loading passkey at the level of the authorization center, the second enciphering/deciphering means (MACCA) transmit the enciphered loading passkey (EKCH or EPCH) with the aid of the storage passkey (KC or FA) to the first enciphering/deciphering means (MACSAA) which decipher it with a view to storing it at the level of the access system (SAA) and in the case of storage of the remote loading passkey in the access system (SAA), the first and second remote loading means (ACHSAA and ACHPA) exchange the remote loading request word (R) for the number of value units to be remotely loaded (n) as well as the transform (RES) of said remote loading request word under the remote loading function (ACH or (FCH)) with the aid of the remote loading passkey (KCH or (PCH, SCH)) with a view to remotely loading, in a secure manner, the means for prepayment of said number of value units (n).

14. The process as claimed in claim 13, wherein before exchanging the remote loading request word (R) and its transform (RES), the first and second system authentication means (AUSAA and AUSAACA) exchange an authorization authentication word (R1) and its transform (RES1) under the system authentication function (AO or FO) with the aid of the system authentication passkey (KO or (SO, PO) with a view to authenticating the authorization of the remote loading order.

15. The process as claimed in claim 13 wherein simultaneously with the exchanging of the remote loading request word (R) and its transform (RES), the first and second remote loading means (ACHSAA) and ACHPA) exchange a reception authentication word (R2) and its transform (RES2) under the remote loading function (ACH or FCH)) with the aid of the remote loading key (KCH or (PCH, SCH)) with a view to authenticating the reception of the remote loading order.

* * * * *